Nov. 3, 1964  P. M. STIGLIC ETAL  3,155,019
HOT GAS SERVO SYSTEM HAVING ROTARY ACTUATOR
Filed May 6, 1960  4 Sheets-Sheet 1
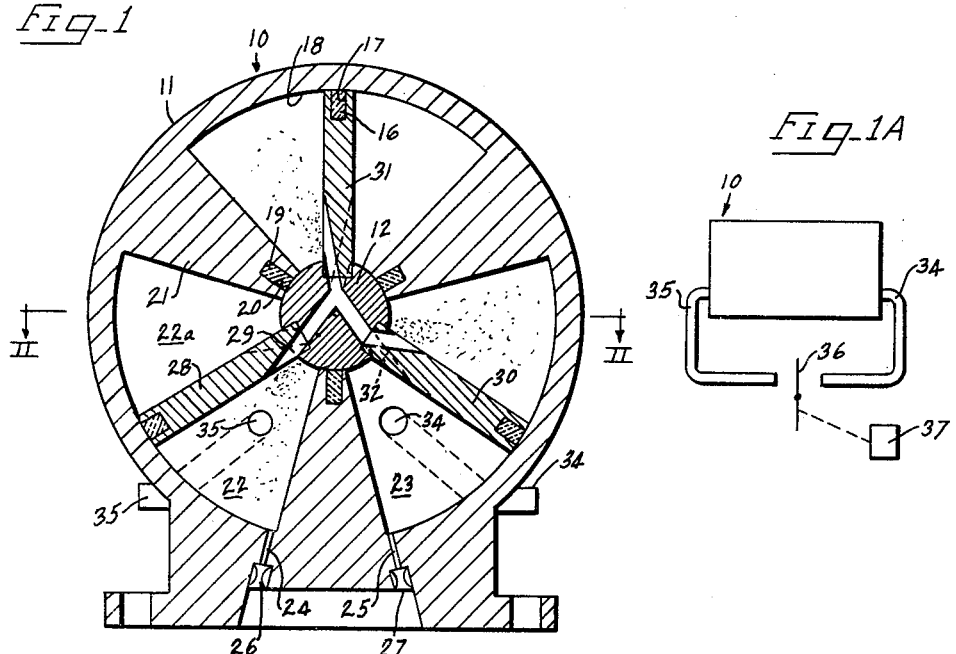
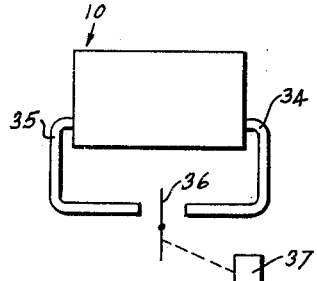
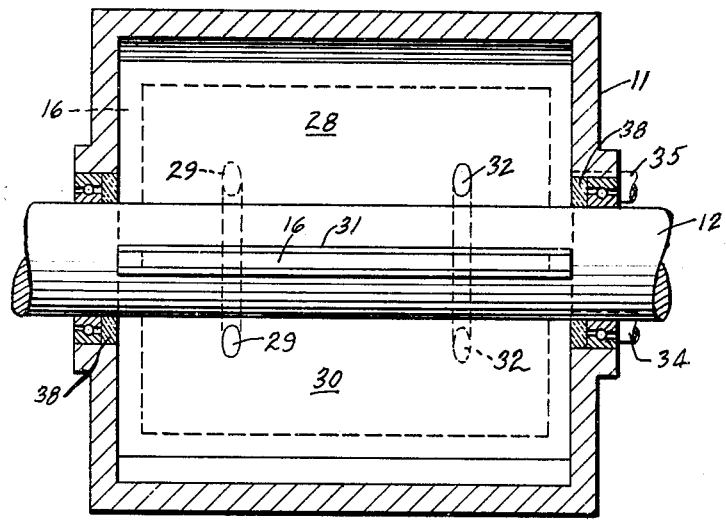
Inventors
Paul M. Stiglic
Daniel J. Shramo
Charles R. Hehmeyer
by Hill, Sherman, Meroni, Gross & Simpson
Attys.

A - ALUMINUM - DYNAMIC CHAMBER
B - STEEL - DYNAMIC CHAMBER
C - STEEL - STATIC CHAMBER
D - ALUMINUM - STATIC CHAMBER

Nov. 3, 1964  P. M. STIGLIC ETAL  3,155,019
HOT GAS SERVO SYSTEM HAVING ROTARY ACTUATOR
Filed May 6, 1960  4 Sheets-Sheet 3
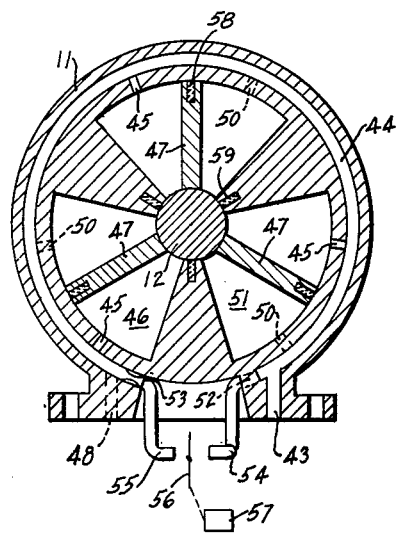
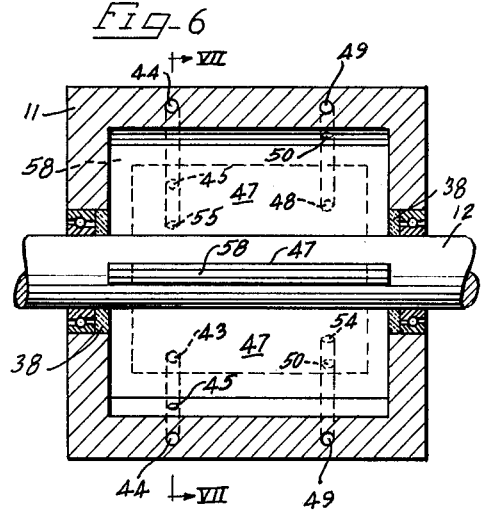
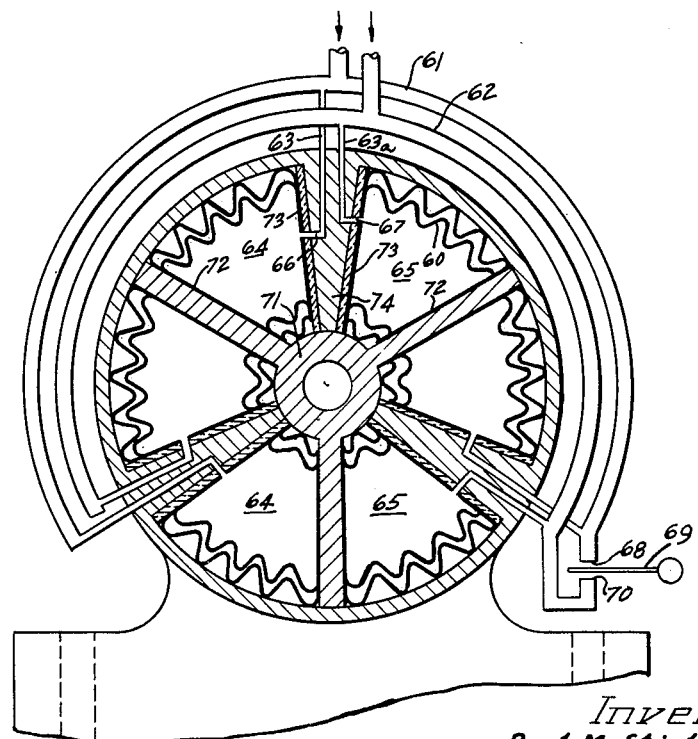
Inventors
Paul M. Stiglic
Daniel J. Shramo
Charles R. Hehmeyer
by Hill, Sherman, Meroni, Gross & Simpson
Attys

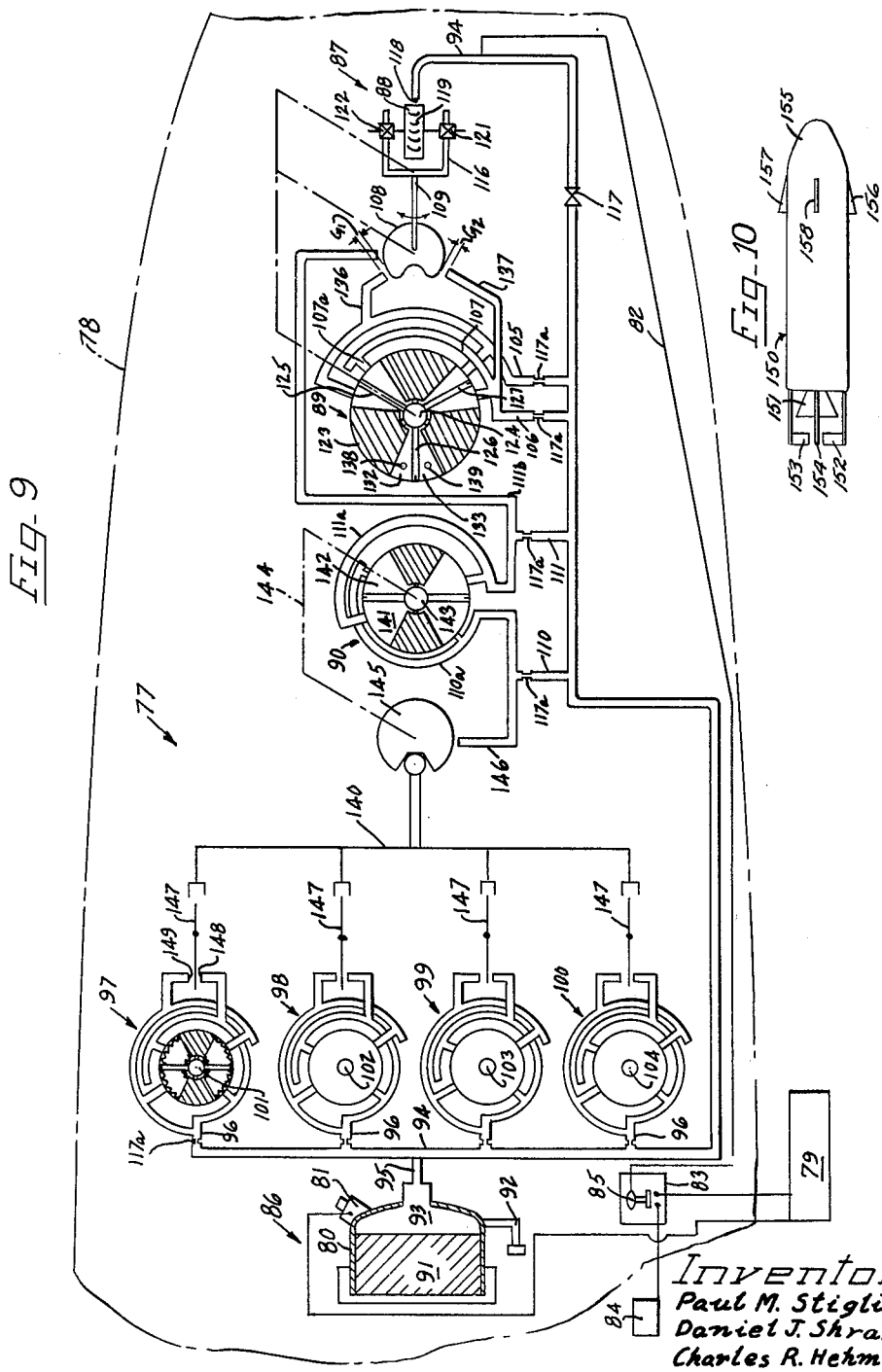

3,155,019
HOT GAS SERVO SYSTEM HAVING
ROTARY ACTUATOR
Paul M. Stiglic, Wickliffe, and Daniel J. Shramo and Charles R. Hehmeyer, Willoughby, Ohio, assignors to Thompson Ramo Wooldridge Inc., Cleveland, Ohio, a corporation of Ohio
Filed May 6, 1960, Ser. No. 27,384
3 Claims. (Cl. 92—39)

The present invention relates broadly to rockets, guided missiles and air and space borne vehicles, and is more particularly concerned with hot gas servo system assemblies having special utility in the performance of flight stabilization and control.

Heretofore difficulty has been encountered generally in the selection, design and application of servo systems wherein vehicle flight control surfaces, vector nozzles or thrust nozzle gimbal arrangements performing the functions of pitch, yaw control and roll control are to be actuated by the servo system operatively responsive to signals received from a remote source, such as the vehicle autopilot system.

Employment of hot gas servo systems in preference to hydraulic systems has the decided advantage of simplicity and the attendant advantages of higher reliability and lighter weight in that the rotary actuator of a hot gas servo system is operated directly by hot gases and the required turbine, pump, valves, filters, return lines, sump and fuel inventory assemblies of hydraulic systems are unnecessary.

Hot gas servo systems previously utilized employ a continuous flow of hot gases from an auxiliary gas supply to maintain a condition of pressure equilibrium in a plurality of chambers defined by the housing of an actuator shaft and a plurality of radially extending vanes depending from an actuator shaft positioned in the housing.

In hot gas servo systems of this type, the actuator shaft is connected to a selected vehicle flight control means for actuation thereof. When gas pressure in the vane chambers is in equilibrium, the respective vanes positioned therein and depending from the actuator shaft are held in a stationary position. However, should a pressure differential be produced in the vane chambers, the vanes will move in the direction of low pressure and cause rotation of the actuator shaft, thus moving the vehicle flight control surface in the desired direction.

Movement of the actuator shaft will continue until a condition of pressure equilibrium is again restored in the vane chambers whereupon the actuator shaft will have returned to its normally inoperative position and thereby return the corresponding vehicle flight control means to its normally inoperative position.

To produce the pressure differential in the vane chambers, control means may be provided to restrict flow of the gases exhausting from the chambers through discharge passages formed in the actuator shaft.

Means heretofore utilized for restricting such flow have taken the form of a motor driven shaft having cam means thereon positioned in close proximity to the end of the actuator shaft from which gases are discharged through the passages therein.

In this form of control means, gas continuously flows from the supply source which may be either an auxiliary gas generator containing a solid, liquid, or gel type propellant or from the main combustion chamber, through passages formed in the actuator housing into the vane chambers and from the chambers through actuator shaft passages and discharge in an impinging stream against the cam surfaces of the torque motor shaft thereby maintaining a condition of pressure equilibrium in the vane chambers.

In utilizing this type of control means, when an energizing signal is transmitted to the motor from the remote source, such as the vehicle auto-pilot system, the motor shaft is caused to rotate and, in rotating, either of the cam surfaces on the end thereof will effectively block one of the actuator shaft exhaust passages behind the direction of rotation and open exhaust area ahead of the direction of rotation. The pressure differential thus produced is sensed in the actuator shaft exhaust passages and a corresponding pressure differential is created in the vane chambers. The actuator shaft vanes then move in the direction of low pressure causing rotation of the actuator shaft and the attached flight control surface.

In a second type of gas servo system, the control means provided to restrict flow of gases exhausting from the chambers may take the form of a flapper valve.

The gases discharge from the chambers through conduits which direct flow of gases in an impinging stream against opposed surfaces of a pivoted flapper valve positioned equidistant between the conduits which may be operated either mechanically through a series of linkage by a control source or may be directly responsive to an electrical signal for movement thereof.

In this form of hot gas servo system, as long as the valve is positioned to provide an equal gap distance between the ends of the conduits discharging gas thereagainst, the pressure in the vane chambers will be in equilibrium and unaffected thereby. However, movement of the valve in either direction will produce a corresponding pressure differential in the vane chambers and cause movement of the vanes in the direction of low pressure.

Heretofore because of the proximity of the servo system to the rocket engine with its attendant high temperature operating environment and because of the elevated temperatures produced by the hot gases continuously flowing through the vane chambers and conduit means, only high temperature resistant materials could be utilized in the construction of the various components of the actuator assembly.

As an example of the metals used, high nickel-chromium iron alloys commonly known in the trade as "Inconel" have been used in the construction of a servo assembly body, rotor and stators. This servo assembly was tested, using gas generated from a burning solid propellant at a temperature of 1600° F. and a pressure of 1000 p.s.i. for a period of 190 seconds. By use of appropriately placed thermocouples, it was determined that the metal temperatures in the servo chambers were of the order of 1180° F.

By employment of our invention which provides a re-manifolding of the gas passages of the actuator housing, the temperatures existing in the chambers under similar test conditions never exceeds 620° F. A temperature reduction of 560° F. was obtained thereby permitting the utilization of more readily available materials which, it will be appreciated, may become a critical problem in the event of national emergency.

Thus the material problem is completely eliminated and common materials, even aluminum, may be used as the materials from which actuator assemblies are to be constructed.

Another major disadvantage in the utilization of rotary gas actuators is that sealing of the vane chambers is a critical problem. By employment of our invention the sealing problem is similarly eliminated.

It is therefore an object of the present invention to provide a hot gas servo system adapted to be connected to either an auxiliary gas generator or to the main combustion chamber and is particularly suitable for flight stabilization about a selected axis and for effecting tilting movement about a selected axis of a single main thrust nozzle for yaw or pitch control of rocket, guided missile and space borne vehicles as well as related applications.

Another object of the present invention is to provide a rotary gas actuator characterized by a plurality of chambers receiving vanes mounted by a shaft connected to a flight control surface, and by a gas supply manifold arrangement whereby gas is supplied to the vane chambers to maintain a condition of pressure equilibrium in the chambers, said manifolds having terminal outlets which supply gases therefrom in an impinging stream against control means adapted to regulate pressure conditions in said vane chambers.

Still another object of this invention is to provide gas supply inlet manifolding communicating with the vane chambers so as to minimize heat transfer from the gases to the actuator assembly.

A still further object of this invention is to eliminate the requirement for a plurality of seal means for the vane chambers.

An additional object of this invention is to provide bellows seal means defining the gas working areas in the vane chambers of a hot gas servo system.

Another object of the present invention is the provision of a compact and simple hot gas servo system, economical in construction and efficient in operation.

These and other objects and features of the present invention will become apparent upon a careful consideration of the following detailed description, when taken in conjunction with the accompanying drawings illustrating preferred embodiments of our invention, wherein like reference characters refer to like or corresponding parts throughout the several views.

As shown on the drawing:

FIGURE 1 is an enlarged transverse cross-sectional view of a hot gas servo actuator showing the details of vane chambers utilizing conventional seal means;

FIGURE 1a is a schematic view showing one form of pressure control means utilized in our invention;

FIGURE 2 is a longitudinal cross-sectional view of the servo actuator of FIGURE 1;

FIGURE 6 is a longitudinal cross-sectional view of a servo actuator constructed in accordance with our invention;

FIGURE 7 is a transverse cross-sectional view of a servo actuator of this invention taken along the lines VII—VII of FIGURE 6 and shown on an enlarged scale;

FIGURE 8 is an enlarged transverse cross-sectional view of a modification of the servo actuator of our invention illustrating a modified form of manifold inlet passaging and the novel seal means of this invention;

FIGURE 9 illustrates one form of a flight control and stabilization system for stabilizing a vehicle about a selected axis in which the servo system of our invention may be employed; and FIGURE 10 is a generally schematic view in side elevation of a vehicle employing pairs of vanes for stabilizing the attitude of the vehicle about selected axes.

Figure 3:
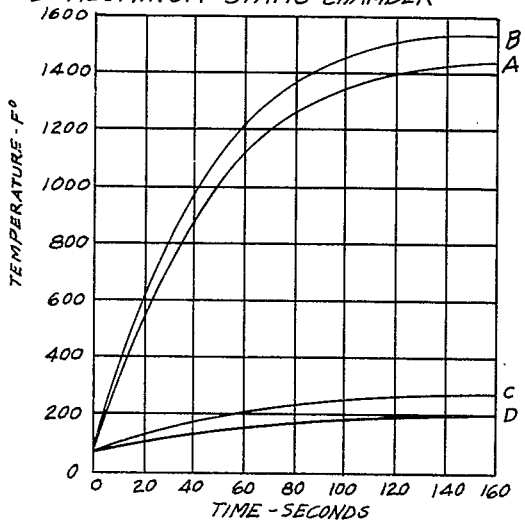
FIGURE 3 is a temperature-time graph comparing dynamic chamber temperatures with static chamber temperatures.

Referring to the drawing, the servo actuator 10 illustrated in FIG. 1 includes a housing 11 defining a plurality of compartments. An axially positioned actuator shaft 12 longitudinally extends within the housing and has mounted thereon, or formed integrally therewith, a plurality of vanes extending radially into the housing compartments thereby separating each compartment into a pair of gas chambers.

Seal means 16 are press-fitted into peripheral recesses 17 formed in the outer surface of each vane. These seal means are so positioned to contact the inner arcuate surface 18 of the compartments so as to provide a gas leak seal across the vane boundary between the pair of chambers into which each compartment is divided.

Similar seal means 19 are press-fitted into recesses formed in the arciform inner surfaces 20 of the actuator housing web 21.

Actuator chambers 22 and 23 each communicate with a gas supply source (not shown) through passages 24 and 25, respectively, formed in the actuator housing. Fixed restrictions 26 and 27 are positioned in these inlet passages for control of flow therethrough.

Vane 28 defining chambers 22 and 22a has formed therein a passage 29 opening into chamber 22 which communicates with passages in the actuator shaft and vanes 30 and 31 to supply gas to identical chambers on one side of each vane 30 and 31. Similarly gas inlet chamber 23 communicates with a passage 32, shown by the dotted lines, formed in vane 30 which communicates through passages shown by the dotted lines formed in the actuator shaft 12 and in vanes 28 and 31 to supply gas to the opposed chambers.

Each gas inlet chamber 22 and 23 has an outlet or bleed-down port 34 and 35 formed in an end wall thereof for gas discharge therefrom against flapper valve 36, shown in FIG. 1a, which is responsive to movement from a signal received from a remote source 37.

As appears in FIGURE 2 actuator shaft 12 is journaled in one end wall of the actuator housing 11 and inwardly of both bearings, seal means 38 are provided to prevent gas leakage from the vane chambers along actuator shaft 12.

Thus, if each of the pair of inlet chambers 22 and 23 are considered "dynamic" chambers and the chambers supplied gases therefrom as "static" chambers, it can be seen that gas is supplied through the pair of inlet passages 24 and 25 to dynamic chambers 22 and 23 respectively, through the passages 29 and 32 formed in the dynamic chamber vanes and through the passages in actuator shaft 12 to the static chambers on each side of each vane thereby maintaining the vanes in a stationary position due to the pressure equilibrium produced on opposed sides thereof.

As appears in FIG. 3, results of a heat transfer study for such a servo unit indicate that a large difference in operating metal temperatures exists between the dynamic chambers and the static chambers.

Figure 4:
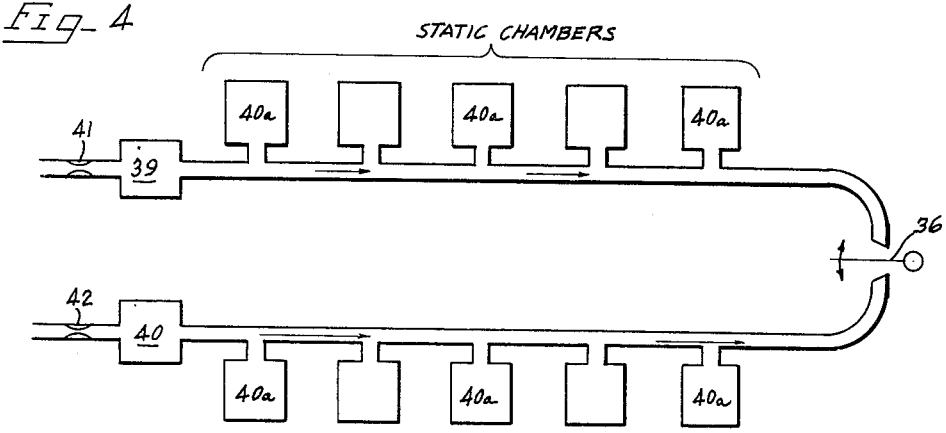
FIGURE 4 is a schematic diagram showing the flow pattern through a servo system actuator illustrating static and dynamic flow chambers.

This can best be explained by reference to a gas flow pattern through such a servo system as is schematically shown in FIG. 4.

Dynamic chambers 39 and 40 must be fed hot gases through the fixed venturi restrictions 41 and 42 which causes a higher gas velocity through chambers 39 and 40 and consequently a high convective heat transfer to the metal parts thereof occurs. On the other hand, hot gas flow changes are sensed in static vane chambers 40a only when pressure is increased and therefore the chambers experience a low average rate of convective heat transfer from the gases to the metal components of which these static chambers are constructed. In the theoretical phase of the study, radiation, and force convective were taken into consideration.

FIG. 3 illustrates the results of the heat transfer study by plotting metal temperatures against operating time. Curve A shows the temperature-time history of an aluminum dynamic chamber. Curve B shows the temperature-time history of a steel dynamic chamber whereas curve C shows the time-temperature history of a steel static chamber and curve D the history of an aluminum static chamber.

At the end of 60 seconds, these curves indicate metal temperatures in the steel dynamic chamber will reach 1200° F. whereas the steel static chamber temperature rises only to 200° F. For purposes of this study, supply gas generated from a solid grain propellant source was assumed to enter the servo motor at 1750° F. and 1000 p.s.i. while the unit was being cycled at the rate of 5.0 c.p.s. The curves lead to the conclusion that material problems can be greatly reduced by using only static chambers in a hot gas servo system.

Figure 5:
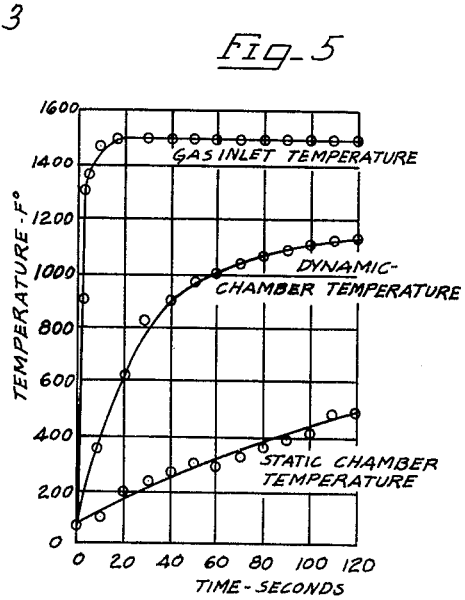
FIGURE 5 is a temperature-time curve history showing a comparison of gas supply inlet temperature, dynamic chamber temperatures and static chamber temperatures.

A steel servo unit was constructed and actual tests conducted thereon which empirically substantiate the data shown in FIG. 3 as will appear from a review of FIG. 5.

The gas inlet pressure temperature to the dynamic chambers was of the order of magnitude of 1500° F., the temperature of the dynamic chamber at the end of 100 seconds was approximately 1100° F. whereas the temperature of the static chambers at the end of the same period was approximately 400° F.

From this information, it is apparent that a difference of 700° F. could be achieved in servo system operating temperatures if all the vane chambers were static chambers.

Utilization of only static chambers in a servo unit therefore reduces material problems to the point where any number of materials, including aluminum and magnesium, may be considered.

In FIGS. 6 and 7 is shown one form of static chamber manifolding constructed in accordance with our invention wherein a gas flow inlet orifice 43 communicates with a manifold gas flow passage 44 formed in the actuator housing and having branch conduits 45 opening into a static chamber 46 on the same side of each vane 47. A similar inlet conduit 48, manifold 49 and branch conduits 50 are provided for supplying gas to the static chamber 51 on the opposed side of each actuator vane. Each manifold terminates in a bleed-down port 52 and 53, respectively positioned at its outlet end.

The chamber bleed-down ports 52 and 53 are connected to bleed-down conduits 54 and 55, respectively, which discharge gases against opposed sides of control valve 56 similar to the centrally pivoted flapper valve of FIG. 1a. Valve 56 is positioned equidistant between the outlets of bleed-down conduits 54 and 55 whereby movement of flapper valve 56 in either direction will cause a corresponding pressure response in the two opposed sets of vane chambers, depending upon the direction of movement of the flapper valve. Flapper valve 56 is operatively responsive to an energizing source 57 of conventional construction to effect movement thereof.

In this embodiment it is unnecessary to form transverse passages in either the actuator shaft or the vanes and consequently a more simple structure is provided. Seal means including seals 58 and 59, similar to the seal means of FIG. 1, provide gas-tight vane chambers.

Thus pressurizing gas flows into both inlets 43 and 48, through the manifold passages 44 and 49, through the branch conduits 45 and 50 into each of the static chambers 46 and 51, and the vanes are thereby maintained in a stationary position as a result of pressure equilibrium on each side thereof. The manifold bleed-down ports communicate with external outlet conduits 54 and 55, the outlets of which discharge gases against opposed sides of control valve 56. Movement of control valve 56 in either direction causes a pressure unbalance in the vane chambers and thereby movement of the rotor shaft in the direction of low pressure.

The operating temperature of steel static chambers, when compared with similar chambers constructed from aluminum in curves C and D of FIG. 3 indicate that operating temperatures of both materials will be quite similar at the end of 120 seconds.

A steel servo unit is preferred even though the total weight of the steel unit was 3.6 lbs. as compared to aluminum unit weight of 3.3 lbs.

The approximate weight equality is possible because steel may be alloyed for a yield strength of 200,000 p.s.i. at 400° F., whereas the comparable yield strength for aluminum at the same temperature is only about 35,000 p.s.i. Consequently, while aluminum is approximately one-third the density of steel, steel is preferred since it has approximately six times the strength of aluminum and is more dimensionally stable under repeated temperature cycling. Furthermore, because of its high yield strength, a unit made of steel could be volumetrically smaller than a comparable aluminum servo system. An additional advantage of a steel unit is that steel can be precision cast and necessitates only internal chrome plating to provide rubbing surfaces for the seal means.

Consequently by employment of our invention in which only static chambers are utilized as the operating chambers for the rotary shaft vanes, we are able to provide a simple manifold gas porting circuit which enables the use of readily available materials and reduces the temperature operating conditions of the servo system considerably and within acceptable limits for utilizing readily available materials of construction.

Since almost all applications of hot gas servo systems require a rotary motion, the simplest method of providing such motion is to use a rotary actuator. Furthermore, since most applications require an oscillating motion through small angles (less than +20°), several sets of vanes can be built into an actuator providing maximum torque output for any given actuator size.

A further advantage of the rotary approach is that the mass is balanced about the center of rotation; therefore, the rotary actuator is unaffected by linear vibrations caused by any source.

However, the one admitted disadvantage of this method, as is apparent from a study of FIGS. 6 and 7, is that of sealing. Simply stated, it is much more difficult to seal a square than a round hole.

The lower operating temperatures obtained by employment of our static manifolding concept permits a new approach to the sealing problem and further provides what is considered the ultimate design in sealing of rotary actuators. With seals constructed in accordance with our invention, we obtain zero internal and external leakage, extremely low breakaway torque between the vanes and compartment walls and elimination of the requirement for close tolerance machining as is required in the type of actuator shown in FIG. 1.

Metal wiper seal means constructed of an alloy, identified in the trade as "Stellite 25," depend upon a metal-to-metal surface for sealing purposes. In the servo unit of FIGURE 1 the recesses in the vane peripheries and arciform inner surfaces of the actuator housing had to be machined flat and square to within .001 with a 10 microns surface. It will be appreciated that this machining operation, involving a great deal of machine lapping, was quite expensive on an individual basis, but, as a result of our invention may be reduced considerably in volume production.

An alternative embodiment of our improved method and apparatus for sealing a static chambered manifold actuator, as shown in FIGURE 8, includes bellows-shaped seal means 60 of spaced apart double wall construction thereby permitting a tolerance for thermal lag. Bellows seal means 60 are constructed of suitable material, for example, a limp fabric web of a silicone elastomer, known in the trade as "Selastic 51," which will withstand temperatures of 700° F., well within the temperature operating range of the static manifold chambers of our invention. For added strength a fiber glass cloth may be laminated to the bellows web.

In the alternate arrangement of actuator construction as appears in FIG. 8, gas flows from a gas source (not shown) through a pair of externally positioned manifold conduits 61 and 62 through a plurality of branch conduits 63 and 63a to the vane chambers 64 and 65. Each manifold feeds a branch conduit 66 and 67 positioned for opening into opposed sides of the vane chambers. A terminal outlet 68 of manifold 61 discharges gas therefrom against a flapper valve 69 whereas manifold 62 has a similar terminal outlet 70 which discharges gas against the opposed side of flapper valve 69 which is in equidistant spaced relation with each outlet. Thus movement of valve 69 in either direction creates a pressure differential in the vane chambers 64 and 65 and causes corresponding rotation of actuator shaft 71.

Bellows seal means in accordance with our invention are shown positioned in each vane chamber and are bonded to one side 72 of each actuator vane and to a metal or silicon resin layer 73 laminated or bonded to the actuator housing web 74 thereby enclosing the gas working area of the chambers providing a leakproof chamber working area.

By bonding the bellows to the housing web portion having formed therein the gas inlet ports, external as well as internal leakage is prevented.

Furthermore, since no metal-to-metal contact is made between the vanes and the housing in this modification, breakaway friction between these parts will be nil and there is no necessity for machine finishing in this area. Consequently precision cast parts can be used throughout in the actuator construction with a minimum of finishing on such elements as bearing bores and journals.

Thus gas flowing from a gas generator source is supplied through conduit manifolds 61 and 62 to the vane chambers 64 and 65 through housing positioned branch conduits 63 and 63a and also through the discharge outlets in the manifolds against opposed sides of flapper valve 69.

Movement of valve 69 in either direction will create a pressure differential in manifolds 61 and 62 which will be sensed in vane chambers 64 and 65 and cause the vanes on the actuator shaft to move in the direction of low pressure, thus causing rotation of actuator shaft 71 and corresponding movement of the control surface to which the actuator shaft is attached.

Movement of vanes 72 will cause constriction of the bellows seal means defining the chambers of low pressure and will permit volumetric expansion in the chambers of higher pressure.

In the actuator shown in FIG. 8 the vanes are so positioned as to permit a plus or minus 20° to 26° angular movement of the actuator shaft.

Thus it will be appreciated that by employment of a manifold dynamic chamber feeding branch inlets communicating with static vane chambers, operating temperatures in these static chambers are reduced in kind rather than in degree, permitting both utilization of readily available materials and the construction of a more simple and reliable servo mechanism. Furthermore, because of the reduced temperatures thereby obtained, the utilization of a simple and novel bellows seal arrangement to encapsulate the gas working area in the vane chambers is now permitted, thereby completely eliminating the requirement for straight edge or wiper type seal means.

To exemplify a suitable environment for application of hot gas servo systems of our invention, as appears in FIGURE 9, there is illustrated a complete, self-contained hot gas flight stabilization system for controlling the attitude of the vehicle about a selected axis which is dependent only on a low level electrical signal to initiate operation thereof. The importance of a complete and self-contained flight stabilization system for controlling the attitude of the vehicle about a selected axis is readily apparent and would eliminate the presently required electrical and mechanical components of such stabilization systems, thereby providing a simple and more compact system.

For clarity of discussion, the various components of the stabilization system for controlling the attitude of the vehicle about a selected axis have been partially illustrated schematically in FIGURE 9 and the discussion now to follow will explain the elements and operation thereof.

The servo manifolding and pressure control means are rearranged and such changes will be noted as the description proceeds.

The stabilization system 77 for controlling the attitude of the vehicle about a selected axis may be conveniently mounted at any available location in the vehicle 78 and operation thereof may be initiated in the firing sequence of the vehicle. The vehicle of course includes the conventional propulsion system propellant flow lines, fuel pressure or pump system, injection nozzles, combustion chamber, an igniter, and a conventional thrust nozzle.

It will be appreciated that an important consideration in the operation of any such vehicle is that of preventing commitment of the vehicle to "take off" until the stabilization system for controlling the attitude of the vehicle about a selected axis has been pressurized and is known to be operating properly.

In order to prevent such commitment, the electrical "fire command" signal means 79 may be utilized to initiate operation of the stabilization system gas generator 80 as well as the main propulsion system and related components. The fire command signal may be fed to the gas generator igniter 81, the gas supply propellant ignited, and gas supplied to the flight stabilization 77 and to a system "feed back" device 82 for transmitting a "check out" signal indicating when the flight stabilization gas supply system pressure has reached the desired operation level. The check out signal may be transmitted to a "fire command" interlock device 83, such as shown in FIGURE 9, which holds the fire command signal from the main propulsion system 84 until the check out signal has been received from the flight stabilization system. Pressure responsive switch means 85 may be positioned in the interlocking device 83 calibrated to open when the predetermined operating pressure of the stabilization system has been sensed and thereby permit the fire command signal to be transmitted to the propulsion system and related systems in order to commit the vehicle to take off.

Such a stabilization system for controlling the attitude of the vehicle about a selected axis, generally indicated by the numeral 77 in FIGURE 9, is pneumatically operated by a gas flow loop wherein gas flowing from a single gas source operates the complete system.

The stabilization system for controlling the attitude of the vehicle about a selected axis, in general, comprises five major assemblies including, a pneumatic supply system 86 including a gas generator 80, a rate sensor system 87 including, for example as shown, a rate sensitive gyro 88, a gyro precession restraining and dampening system 89, a pilot servo system 90 operatively responsive to the rate sensor system 87 for controlling the vehicle flight control hot gas actuator systems and the hot gas servo actuators 97, 98, 99 and 100.

The pneumatic supply system 86 includes a gas generator housing 80 containing a suitable propellant 91 which may be a solid, as shown, and igniter 81. A pressure responsive blow out device 92 is utilized to permit escape of gases from generator 80 whereby pressure in propellant chamber 93 may be decreased and cause extinguishment of combustion therein. Gases produced by the generator flow to all the above identified major components through a single main conduit 94 having branch conduits leading to each of these components.

A generator gas flow outlet conduit 95 communicates with conduit 94 which communicates with a plurality of branch conduits 96 for supplying gas to the hot gas servo actuators 97, 98, 99 and 100 of FIGURE 9 and which may be suitably connected by one end of their respective actuator shafts 101, 102, 103 and 104 to vehicle flight control surfaces which may perform such functions as either vehicle pitch, yaw, roll or thrust reversal control, or other flight control means.

For purposes of illustration, an air or space borne vehicle, generally indicated by the numeral 150, may be provided with a plurality of vanes extending into the exhaust gas jet stream of the main gas discharge nozzle 151 of the vehicle. For this purpose, four such vanes, constructed of a refractory material such as graphite, may be positioned at diametrically opposite positions or approximately 90° apart. The pair of vanes 152 and 153 control movement of the vehicle in the yaw plane whereas the other pair of vanes 154, one of which is shown in FIGURE 10, are actuatable to control pitch movement of the vehicle. The shafts of the vanes 152 and 153 may be appropriately coupled for movement to actuator shafts 101 and 102. In addition, a finer control of pitch and yaw movement of the vehicle may be provided by pairs of Canard type fins mounted adjacent the front end 155 of the vehicle. Four such fins may be provided and located approximately 90° apart. As appears in FIGURE 10, fins 156 and 157 cooperate with vanes 152 and 153 for controlling movement of the vehicle in the yaw plane whereas fin 158 and a complementary fin (not shown) located approximately 180° therefrom cooperate with vane 154 and its associated vane for controlling the attitude of the vehicle in the pitch plane. The shafts (not shown) of the fins 156 and 157 may be appropriately coupled to the actuator shafts 103 and 104 whereby the attitude of the vehicle in the yaw plane may be controlled more precisely by the cooperating fin and vanes. The operation of the actuator shafts 101–104 will be more fully explained hereinafter.

It will be understood that hot gas servo actuators 98, 99 and 100 are identical in construction and operation with hot gas servo actuator 97, having two vane chambers and employing four bellows seal means.

Main gas supply conduit 94 communicating with branch conduits 110 and 111 supplies gas to the respective vane chambers of pilot servo system 90 through manifold conduits 110a and 111a. Branch conduit 111 supplies gas to conduit 111b which directs gas in an impinging stream against cam 108 mounted on gyro output shaft 109.

Main supply conduit 94 also communicates with branch conduits 105 and 106 which supplies gas to the vane chambers of the gyro restraining system 89 through a pair of manifold branch conduits 107 and 107a. Manifold branch conduits 136 and 137 are positioned to discharge gas in an impinging stream against opposed surface of cam 108 mounted on gyro output shaft 109 mounted in gimbal support 116.

Downstream of branch conduits 105 and 106 a fixed restriction 117 is positioned in main conduit 94 which may be constructed in the form of a foraminous carbon disc to provide means for controlling gas supply to the rate gyro sensing elements 88 through outlet 118. Each of the system branch supply conduits include a fixed restriction 117a for regulating gas flow therethrough.

The rate gyro system 87 includes the rate gyro element 88 which may be any device responsive to the rate of movement of the vehicle about a selected axis, such as the yaw axis and which is adapted to deliver an angular force proportional to the rate of angular movement of the vehicle 78. Element 88 is shown in this embodiment as a conventional type gyro wheel having formed in the outer periphery thereof a plurality of protuberances or turbine blades 119 against which gases discharge from outlet 118 of main conduit 94 in an impinging stream thereby providing a motive force for spinning up gyro 88.

A gimbal frame 116 suitably mounts rate gyro 88 in conventional low friction bearings 121 and 122 and is positioned to permit rotation of gyro 88 about the selected axis. An output shaft 109 is secured to gimbal frame 116 responsive to the angular force produced by precession of the rate gyro element 88 for imparting rotary motion to the coaxially aligned cam 108 on shaft 109.

Thus gas supplied through the fixed restriction 117 and main gas supply conduit 94 is discharged in an impinging stream against the blades 119 formed in the outer periphery of gyro element 88 and thereby causes rotation of the gyro wheel in the bearings 121 and 122 carried by the gimbal frame 116. If gas supply pressure is maintained at approximately 1000 p.s.i., gyro wheel speed may approach 60,000 r.p.m.

The rate of movement of the vehicle, in which the sensor is positioned, about the selected axis causes precession of the rate gyroscope and corresponding rotational movement of gyro output shaft 109 and cam 108 in either direction depending upon the character of the gyro precession.

However, means must be provided to restrain precession of the gyro within the set operating limits thereof and, for this purpose, we provide the restraining system 89 employing a servo unit constructed in accordance with our invention and having a rotary shaft 124 integral with or closely coupled to the output shaft 109 of the gyro element.

The servo unit shown in FIGURE 9 preforming the gyro restraining and dampening function includes a housing 123 defining three compartments and having an actuator rotor shaft 124 centrally positioned therein which is journalled in a boss (not shown) in one end of housing 123, and the other end of actuator shaft 124 is suitably coupled to gyro output shaft 109. Actuator shaft 124 carries vanes 125, 126 and 127, each positioned in a compartment and thereby separating each compartment into a pair of chambers. Each chamber is rendered leakproof by seal means press-fitted in peripheral recesses formed in each vane surface and in the actuator housing inner surfaces similar to the seal means of the actuator of FIGURE 1. Chambers 132 and 133 define means for dampening movement of actuator shaft 124 for purposes hereinafter described.

As shown the two compartments defining the restraining chambers are supplied gas through manifold conduits 107 and 107a which communicate through branch conduits 105 and 106 with the main gas conduit 94. Transverse passages formed in actuator shaft 124 permit flow of gas to dampening chambers 132 and 133.

A pair of branch conduits 136 and 137 formed in the gas supply conduits 105 and 106 respectively are positioned to supply gas against opposed surfaces of cam 108 positioned equidistant therebetween. Bleed-down ports 138 and 139 are positioned in dampening chambers 132 and 133 respectively to permit dampening of the actuator unit.

Thus, when the flight stabilization system is in an inoperative or "null" position, gas flowing into the restraining and dampening unit chambers maintains the rotary actuator shaft thereof in a stationary position. Since the gap distances $g_1$ and $g_2$ existing between the outlets of branch conduits 136 and 137 and the complementary surfaces of cam 108 are equal, pressure conditions in the respective vane chambers are unaffected by gas impingement on cam 108 through these conduits and the actuator shaft is maintained in the neutral or "null" position.

It will be appreciated that movement of the gyro output shaft caused by the precession of the gyro element in either direction will rotate actuator shaft 124, thereby creating an unbalance in the pressure equilibrium conditions existing between the supply manifold conduits 107 and 107a. In addition, however, movement of the gyro output shaft causes movement of cam 108 and thereby creates a difference in the gap distance $g_1$ and $g_2$ existing between the surfaces of cam 108 and the discharge ends of branch conduits 136 and 137. By changing this gap distance relationship, a pressure differential is thereby created in the branch conduits 136 and 137, in manifolds 107 and 107a and in the vane chambers which creates an opposing and restraining counteracting torque on shaft 109 sensed through the actuator vanes which tends to move the actuator shaft in the opposite direction. The gyro output shaft and cam 108 are thereby returned to their original positions when the restraining torque thus produced equals the unbalanced torque on the gyro.

The increased pressure thereby created in one set of vane chambers resists movement of the vanes, and the decrease in pressure in the other set of chambers permits the increased pressure to counteract movement of the vanes and such restraining movement continues until the restraining torque is equal to the unbalanced torque produced on the gyro.

During this unbalanced phase, the bleed-down orifices in the damping chambers provides a pneumatic damping action on the unit. While gas pressure in the damping chambers is a constant during steady state operation, a damping torque is generated during the transient pressure unbalance operation by the gas bleeding through the bleed down orifices.

The vanes are thus returned to their "null" position, the gap distances, $g_1$ and $g_2$ between the branch conduits 136 and 137 and cam 108 are again equally distant, and precession of the gyro effectively restrained by the counter-rotation of the gyro output shaft movable with the actuator shaft.

Thus the restraining servo system produces a counteracting torque proportional to displacement and returns the gyro to its normal position.

The pilot servo system 90 is connected to and operates to transmit commands through the servo linkage 140 which is adapted to actuate the hot gas servo actuator systems 97 through 100, each of which is identical in construction and operation to the restraining servo system unit with the noted exception of having no damping compartment or components.

Branch conduits 110 and 111 communicate with manifold conduits 110a and 111a respectively and supply gas to chambers 141 and 142 to maintain the actuator shaft 143 in a "null" position.

A branch conduit 111b communicates with branch conduit 111 and supplies gas in an impinging stream against the gyro output cam 108.

Thus movement of the cam 108 will be sensed in conduit 111b and a corresponding pressure differential will be created in vane chambers 141 and 142 of the pilot servo system, thereby causing movement of the pair of vanes and rotor 143. Rotor 143 is connected to, or may be mounted integrally with, cam 145 on a common shaft 144 which is movable therewith. Branch conduit 110 communicates with a branch conduit 146 for supplying gas in an impinging stream against servo linkage cam 145.

Thus a change in pressure conditions in the vane chambers of the pilot servo system created by movement of cam 108 causes movement of pilot rotor 143 and cam 145 and corresponding movement of the servo linkage 140. Movement of cam 145 in either direction and corresponding movement of servo linkages 140 will cause movement of centrally pivoted flapper valves 147 which are positioned equidistant between the outlet conduits 148 and 149 of the respective hot gas servo actuators 97 through 100.

In operation therefore movement of gyro output cam 108 will be sensed in the pilot servo vane chambers 141 and 142 and cause rotation of the pilot actuator shaft and the servo linkage control cam attached thereto. Movement of cam 145 will cause a pressure difference to be sensed through conduit 146 in opposed vane chambers of the pilot servo unit and create a counteracting restraining torque through the vanes on the actuator shaft and thereby tend to return the shaft to its "null" position and correspondingly return cam 145 to its null position. Return of cam 145 to its null position returns the servo linkage to its null position and flapper valves 147 are again positioned equidistant between the hot gas servo actuator discharge outlets. The hot gas servo actuator shafts 101–104 are thereby returned to their neutral or "null" position after having caused corresponding movement of the vanes 152 and 153 and fins 156 and 157 to correct the attitude of the vehicle 150 in the yaw plane. It will be appreciated that while cam 108 is being returned to its null position by the counteracting torque created to restrain movement of the restraining shaft 124, a proportional progressive decrease in gas pressure differential will be sensed in conduit 111b and will thereby assist in the return of the pilot actuator shaft 144 to its "null" position.

Return of flapper valves 147 to the null position therefore causes a correspondingly return of the several actuator shafts to their null positions and their respective flight control surfaces to their null positions whereby the overall stabilization system is returned to its initial position.

Thus it can be seen by employment of hot gas servo systems in a flight stabilization system for controlling the attitude of a vehicle with which employed about a selected axis as above described, we provide a compact, simple and safe self-contained system which eliminates the presently required electrical and mechanical components of such systems.

The flight stabilization system is dependent only on a low level electrical signal to initiate the flow of hot gases and the actuator units are compatible to supply the stabilization needs about a selected axis of the most representative vehicle thus far known to have been developed.

The operation of the rate stabilization system shown in FIGURE 9 is initiated by the fire command signal transmitted to ignite the propellant in the gas generator and gas thereby produced is supplied the control surface actuators, the pilot servo system, the gyro restraining and damping system, and to the blades of the rate gyroscope wheel. When the predetermined system operating pressure has been reached, this information is fed to the interlocking device which opens the pressure switch therein and permits the fire command signal to be relayed to the propulsion system ignition means and to other related circuits. The vehicle propulsion, guidance, and self-contained stabilization system for controlling the attitude of the vehicle about a selected axis are now in operation.

When the gyro senses a rate change about the preselected vehicle axis, precession thereof takes place and causes the gimbal output shaft to turn. In turning, the output shaft causes the cam 108 and the restraining servo actuator shaft coupled thereto to rotate. Rotation of cam 108 produces a corresponding counteracting torque which is applied to the restraining servo shaft thereby producing a restraining torque proportional to displacement and returns the gyroscope to its initial position. The pilot servo system senses the change in the position of cam 108 and causes corresponding rotation of it shaft and servo linkage cam. The servo linkage cam causes movement of the servo linkage and through such movement the actuator shaft connected to the particular vehicle flight control surface involved will rotate thereby causing movement of vehicle in the desired direction to offset the change sensed by the rate gyro.

The gyro restraining actuator shaft is returned to its null position by the counteracting torque produced by the pressure conditions under the influence of cam 108, and the pilot servo is returned to its null position by the counteracting torque produced by the combined influence of cams 145 and 108.

The hot gas servo actuators connected to the flight control surfaces are returned to their null positions under the influence of the flapper valves responsive to the servo linkage.

From the foregoing, it will be appreciated that by employment of our invention, a self-contained, complete and effective flight stabilization system for controlling the attitude of a vehicle about a selected axis may be designed and operated.

Another suitable environment for our hot gas servo system units is disclosed in copending application Serial No. 796,311, filed March 2, 1959, assigned to the assignee of the instant application wherein the servo units of the present invention may be substituted for the servo units illustrated in the said copending application.

Although various minor modifications might be suggested by those versed in the art, it should be understood that we wish to embody within the scope of the patent warranted hereon all such embodiments as reasonably and properly come within the scope of our contribution to the art.

We claim as our invention:

1. A rotary actuator comprising in combination:
   (a) a housing having means defining an internal chamber;
   (b) a shaft rotatably mounted on said housing and extending into said housing;
   (c) a vane carried by said shaft and separating the chamber into two compartments;
   (d) a pair of pressurizable bellows means, each of spaced-apart double-wall construction, respectively disposed in each of said compartments, and respectively operative between opposite sides of said vane and said chamber-defining means; and
   (e) a pair of separate conduits respectively communicating with the interior of said bellows means, and each adapted to be connected to a pressurized fluid source.

2. A rotary actuator comprising in combination:
   (a) a housing having means defining a plurality of internal chambers;
   (b) a shaft rotatably mounted on said housing and extending into said housing;
   (c) a plurality of spaced vanes carried by said shaft and respectively separating each of said housing chambers into pairs of compartments;
   (d) a plurality of pressurizable bellows means, each of spaced-apart double-wall construction, respectively disposed in each of said compartments, and respectively operative between opposite sides of one of said vanes and said chamber-defining means; and
   (e) a pair of separate manifold means, one of which communicates through said chamber-defining means directly with the central interior of a plurality of said double-walled bellows means which are disposed in corresponding ones of said pairs of compartments, and the other of which manifolds communicates through said chamber-defining means directly with the central interior of another plurality of said double-walled bellows means with are disposed in corresponding other ones of said compartments, each of said manifold means comprising the sole fluid connection to the interior of the respective bellows means, and each of said manifold means being adapted to be connected to a pressurized fluid source.

3. A rotary actuator comprising in combination:
   (a) a housing having means defining an internal chamber;
   (b) a shaft rotatably mounted on said housing and extending into said housing;
   (c) a vane carried by said shaft and separating the chamber into two compartments;
   (d) a pair of pressurizable bellows means, each of spaced-apart double-wall construction, respectively disposed in each of said compartments, respectively operative between opposite sides of said vane and said chamber-defining means, each of said bellows means respectively having a bonded connection to one lateral side of said vane independent of that of the other and to an opposed wall of said chamber defining means; and
   (e) a pair of separate conduits respectively communicating through said opposed walls with the interior of said bellows means, each comprising the sole fluid communication therewith, and each adapted to be connected to a pressurized fluid source.

References Cited in the file of this patent

UNITED STATES PATENTS

| | | |
|---|---|---|
| 3,350 | Savage et al. | Nov. 24, 1843 |
| 460,241 | Loutsky | Sept. 29, 1891 |
| 706,004 | Anderson | Aug. 5, 1902 |
| 2,041,916 | Flint | May 26, 1936 |
| 2,086,249 | Winchell | July 6, 1937 |
| 2,250,734 | Thompson et al. | July 29, 1941 |
| 2,330,151 | Smith | Sept. 21, 1943 |
| 2,405,208 | Harris | Aug. 6, 1946 |
| 2,463,900 | Nicholson | Mar. 8, 1949 |
| 2,492,252 | Wing | Dec. 27, 1949 |
| 2,509,673 | Church | May 30, 1950 |
| 2,628,793 | Stalker | Feb. 17, 1953 |
| 2,811,141 | Van Coney et al. | Oct. 29, 1957 |
| 2,890,889 | Work | June 16, 1959 |
| 2,902,009 | Ludwig et al. | Sept. 1, 1959 |
| 2,928,409 | Johnson et al. | Mar. 15, 1960 |
| 2,944,526 | Jarvis | July 12, 1960 |
| 2,947,286 | Baltus et al. | Aug. 2, 1960 |
| 2,960,076 | Henry | Nov. 15, 1960 |
| 2,972,241 | Hackforth | Feb. 21, 1961 |
| 2,991,329 | Weingart et al. | July 4, 1961 |
| 3,031,842 | Ledwith | May 1, 1962 |
| 3,047,257 | Chester | July 31, 1962 |

FOREIGN PATENTS

| | | |
|---|---|---|
| 465,473 | Great Britain | May 5, 1937 |
| 644,253 | France | June 4, 1928 |